US012639913B2

(12) United States Patent
Nan

(10) Patent No.: US 12,639,913 B2
(45) Date of Patent: May 26, 2026

(54) PORTRAIT IMAGESKIN RETOUCHING METHOD, APPARATUS, ELECTRONIC DEVICE, AND STORAGE MEDIUM

(71) Applicant: Black Sesame Technologies Co., Ltd., Wuhan (CN)

(72) Inventor: Yuanyuan Nan, Wuhan (CN)

(73) Assignee: Black Sesame Technologies Co., Ltd., Wuhan (CN)

( * ) Notice: Subject to any disclaimer, the term of this patent is extended or adjusted under 35 U.S.C. 154(b) by 329 days.

(21) Appl. No.: 18/505,818

(22) Filed: Nov. 9, 2023

(65) Prior Publication Data

US 2024/0161454 A1 May 16, 2024

(30) Foreign Application Priority Data

Nov. 11, 2022 (CN) ......................... 202211414686.X

(51) Int. Cl.
G06V 10/60 (2022.01)
G06T 5/20 (2006.01)
G06V 10/25 (2022.01)

(52) U.S. Cl.
CPC ................ G06V 10/60 (2022.01); G06T 5/20 (2013.01); G06V 10/25 (2022.01)

(58) Field of Classification Search
None
See application file for complete search history.

(56) References Cited

U.S. PATENT DOCUMENTS

| | | | | |
|---|---|---|---|---|
| 8,406,482 B1 * | 3/2013 | Chien | .................... | G06V 40/10 |
| | | | | 382/165 |
| 2002/0118880 A1 * | 8/2002 | Liu | ......................... | G06F 3/017 |
| | | | | 382/199 |

(Continued)

FOREIGN PATENT DOCUMENTS

| | | |
|---|---|---|
| CN | 107862659 A | 3/2018 |
| CN | 111583154 A | 8/2020 |

(Continued)

OTHER PUBLICATIONS

Ronneberger O, Fischer P, Brox T . U-Net: Convolutional Networks for Biomedical Image Segmentation[J]. Springer, Cham, 2015.

(Continued)

*Primary Examiner* — Randolph I Chu
(74) *Attorney, Agent, or Firm* — Timothy T. Wang; Panorama IP Group PLLC

(57) ABSTRACT

The application relates to a portrait image skin retouching method, apparatus, an electronic device, and a storage medium. The method comprises the following steps: identifying a skin area and a portrait structure area contained in the skin area from a portrait image to be processed; determining a skin analysis area, which is a remaining area of the skin area except the portrait structure area; fitting a pixel value distribution in the skin analysis area by utilizing a Gaussian mixture model, to determine one or more model parameters of the fitted Gaussian mixture model; determining a retouching intensity parameter based on variances the model parameters; and performing skin retouching on the portrait image to be processed based on the retouching intensity parameter. With the method, the proper skin retouching effect can be achieved for portrait images with different image qualities.

9 Claims, 5 Drawing Sheets

(56) References Cited

U.S. PATENT DOCUMENTS

| | | | |
|---|---|---|---|
| 2005/0008193 A1* | 1/2005 | Toyama | G06T 7/20 |
| | | | 382/103 |
| 2007/0154095 A1* | 7/2007 | Cao | G06V 40/162 |
| | | | 382/164 |
| 2007/0154096 A1* | 7/2007 | Cao | G06V 40/171 |
| | | | 382/190 |
| 2013/0243281 A1* | 9/2013 | Nakamura | G06T 7/11 |
| | | | 382/128 |
| 2014/0301651 A1* | 10/2014 | Zhang | G06T 5/70 |
| | | | 382/210 |
| 2019/0014884 A1* | 1/2019 | Fu | G06T 1/0007 |

FOREIGN PATENT DOCUMENTS

| | | | | |
|---|---|---|---|---|
| CN | 112150393 A * | 12/2020 | | G06V 10/267 |
| EP | 2977959 A2 * | 1/2016 | | G06T 11/10 |

OTHER PUBLICATIONS

Qin-qin Zhou, Zhao-hui Zheng. Facial Beautification with self-adaptive Algorithm. J. Jianghan Univ. (Nat. Sci. Ed.). Mar. 2011, vol. 39 No. 1.

* cited by examiner

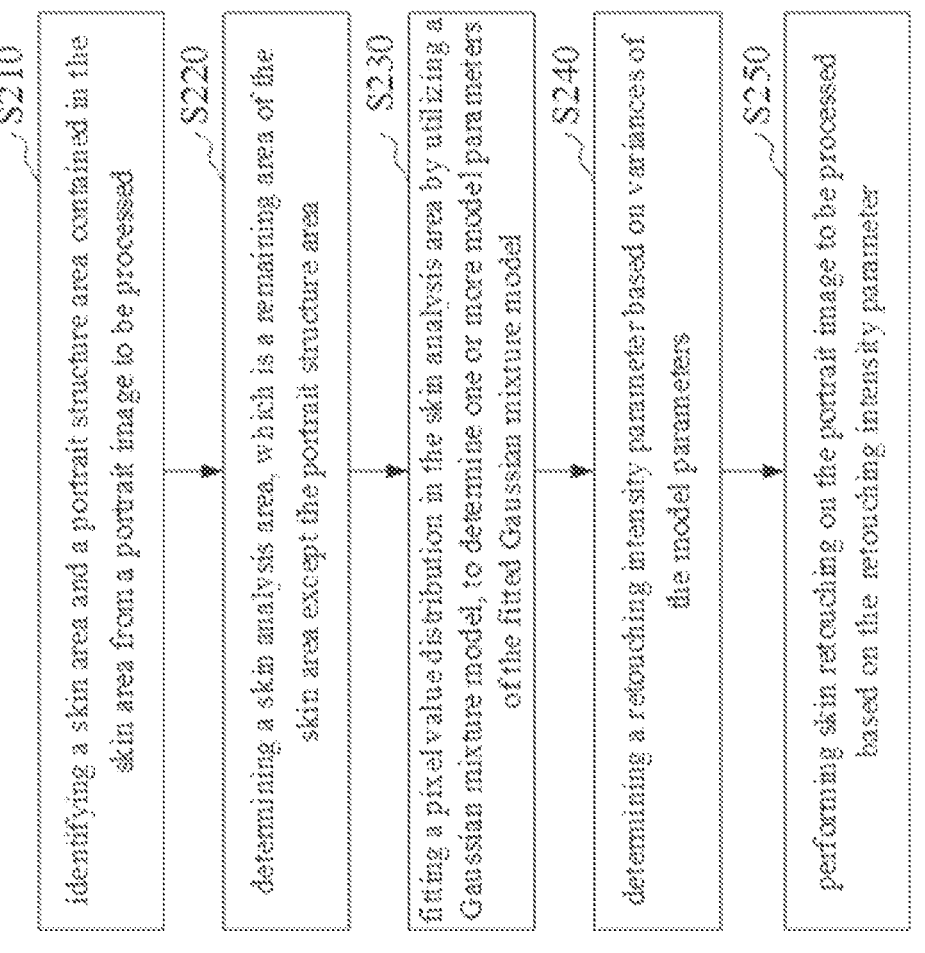

*S210* identifying a skin area and a portrait structure area contained in the skin area from a portrait image to be processed

*S220* determining a skin analysis area, which is a remaining area of the skin area except the portrait structure area

*S230* fitting a pixel value distribution in the skin analysis area by utilizing a Gaussian mixture model, to determine one or more model parameters of the fitted Gaussian mixture model

*S240* determining a retouching intensity parameter based on variances of the model parameters

*S250* performing skin retouching on the portrait image to be processed based on the retouching intensity parameter

FIG. 2

PORTRAIT IMAGESKIN RETOUCHING METHOD, APPARATUS, ELECTRONIC DEVICE, AND STORAGE MEDIUM

RELATED APPLICATION

This application claims the benefit under 35 U.S.C. § 119(a) of the filing date of Chinese Patent Application No. 202211414686.X, filed in the Chinese Patent Office on Nov. 11, 2022. The disclosure of the foregoing application is herein incorporated by reference in its entirety.

FIELD OF THE INVENTION

Embodiments of the present disclosure relate to the image processing technology field, and more particularly, to a portrait image skin retouching method and apparatus, electronic device, and storage medium.

BACKGROUND OF THE INVENTION

Photography and video beautifying are widely applied in mobile phones and other electronic devices with photo and video capture functions. In the process of beautifying the captured portrait image, skin retouching algorithms can be configured to retouch the portrait skin area of the portrait image, thereby making the skin obtain a retouched and delicate impression.

The existing skin retouching algorithms are usually divided into two categories, one directly performs edge-preserving filtering on the image, and the other performs frequency division processing on the image to divide it into a high-frequency image and a low-frequency image, and then performs edge-preserving filtering on the low-frequency image. The retouching intensity parameters of the above two methods are generally preset. However, when the same retouching intensity parameters that are preset are applied in portrait images with different image qualities, for the portrait images with higher image quality, namely higher sharpness and abundant details, the retouching intensity is insufficient, and for the portrait images with lower image quality, namely lower sharpness and more details are lost, the retouching intensity is too strong. Thus, it is difficult to obtain the appropriate skin retouching effect for portrait images with different image qualities.

SUMMARY OF THE INVENTION

In view of the above, it is necessary to provide a portrait image skin retouching method, apparatus, an electronic device, and a storage medium, which can obtain an appropriate retouching effect for portrait images with different image qualities.

In an embodiment of the present disclosure, a portrait image skin retouching method is provided, including:

identifying a skin area and a portrait structure area contained in the skin area from a portrait image to be processed;

determining a skin analysis area, which is a remaining area of the skin area except the portrait structure area;

fitting a pixel value distribution in the skin analysis area by utilizing a Gaussian mixture model, to determine one or more model parameters of the fitted Gaussian mixture model;

determining a retouching intensity parameter based on variances in the model parameters; and performing skin retouching on the portrait image to be processed based on the retouching intensity parameter.

In some embodiments, the Gaussian mixture model includes a linear addition of a first Gaussian model, a second Gaussian model, and a third Gaussian model.

In some embodiments, the first Gaussian model is configured to fit the pixel value distribution of one or more skin bright areas in the skin analysis area, the second Gaussian model is configured to fit the pixel value distribution of one or more skin shadow areas in the skin analysis area, and the third Gaussian model is configured to fit the pixel value distribution of one or more spot areas in the skin analysis area.

In some embodiments, said fitting a pixel value distribution in the skin analysis area by utilizing a Gaussian mixture model, to determine one or more model parameters of the fitted Gaussian mixture model includes:

using an expectation maximization algorithm to fit the pixel value distribution in the skin analysis area by utilizing a Gaussian mixture model, to determine the model parameters of the fitted Gaussian mixture model.

In some embodiments, the model parameters include average values, variances, and weights of multiple Gaussian models included in the Gaussian mixture model.

In some embodiments, said determining a retouching intensity parameter based on variances in the model parameters includes:

determining the average value of standard deviations corresponding to the variances of multiple Gaussian models included in the Gaussian mixture model;

determining the retouching intensity parameter based on the average value; wherein, the retouching intensity parameter is proportional to the average value.

In some embodiments, said performing skin retouching on the portrait image to be processed based on the retouching intensity parameter includes:

performing bilateral filtering on the portrait image to be processed;

wherein, the retouching intensity parameter includes a Gaussian function standard deviation of the definition domain kernel contained in the weight coefficient of the bilateral filtering and a Gaussian function standard deviation of the value domain kernel contained in the weight coefficient.

In an embodiment of the present disclosure, a portrait image skin retouching apparatus is provided, including:

an image area identification module configured to identify the skin area and the portrait structure area contained in the skin area from the portrait image to be processed;

a skin analysis area determination module configured to determine the skin analysis area, which is the remaining area of the skin area except the portrait structure area;

a pixel value distribution fitting module configured to fit the pixel value distribution in the skin analysis area by utilizing the Gaussian mixture model, to determine one or more model parameters of the fitted Gaussian mixture model;

a retouching intensity parameter determination module configured to determine the retouching intensity parameter based on the variances in the model parameters;

and an image skin retouching module configured to perform skin retouching on the portrait image to be processed based on the retouching intensity parameter.

In an embodiment of the present disclosure, an electronic device is provided, including: a memory configured to store computer programs; and a processor configured to execute the computer programs to cause the following steps to be performed:

identifying a skin area and a portrait structure area contained in the skin area from a portrait image to be processed;

determining a skin analysis area, which is a remaining area of the skin area except the portrait structure area;

fitting a pixel value distribution in the skin analysis area by utilizing a Gaussian mixture model, to determine one or more model parameters of the fitted Gaussian mixture model;

determining a retouching intensity parameter based on variances in the model parameters; and performing skin retouching on the portrait image to be processed based on the retouching intensity parameter.

In an embodiment of the present disclosure, a computer-readable storage medium having computer programs stored thereon is provided, wherein when the computer programs are executed by the processor, cause the following steps to be performed:

identifying a skin area and a portrait structure area contained in the skin area from a portrait image to be processed;

determining a skin analysis area, which is a remaining area of the skin area except the portrait structure area;

fitting a pixel value distribution in the skin analysis area by utilizing a Gaussian mixture model, to determine one or more model parameters of the fitted Gaussian mixture model;

determining a retouching intensity parameter based on variances in the model parameters; and performing skin retouching on the portrait image to be processed based on the retouching intensity parameter.

According to the portrait image skin retouching method, apparatus, electronic device, and storage medium provided above, the Gaussian mixture model is utilized to fit the pixel value distribution in the skin analysis area in the portrait image to be processed, so as to determine the model parameters of the fitted Gaussian mixture model. And the retouching intensity parameter is determined based on the variances in the model parameters, and the portrait image to be processed is retouched according to the retouching intensity parameter. Since the variances in the fitted model parameters can represent an image quality of the skin in the skin analysis area, the skin retouching intensity parameters are varied adaptively with the image qualities of the skin to perform different intensities of skin retouching on the portrait image to be processed. Thus, different skin retouching intensity parameters are adjusted adaptively for portrait images with different image qualities, so as to achieve the appropriate skin retouching effect.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 2 is a schematic flow chart of a portrait image skin retouching method according to an embodiment of the present disclosure;

DETAILED DESCRIPTION OF THE INVENTION

Figure 1:
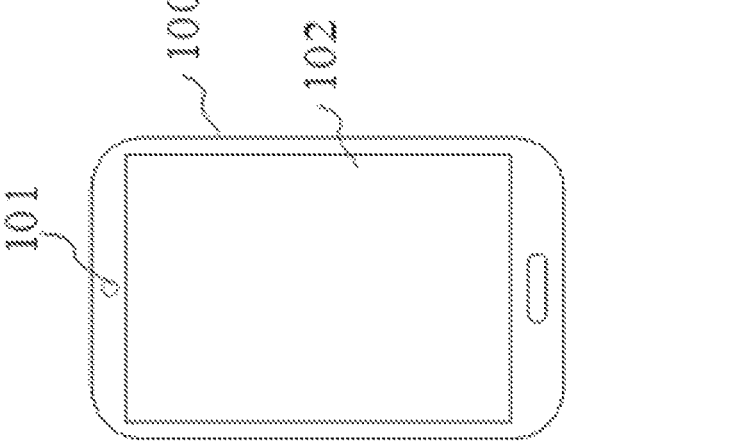
FIG. 1 is a schematic diagram of an electronic device according to an embodiment of the present disclosure.

The present specification may be directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶ 6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

In order to make the objects, technical solutions and advantages of the present disclosure more apparent, the present disclosure is provided in further detail below with reference to the accompanying drawings and embodiments. It should be understood that the specific embodiments provided herein are merely illustrative of the present disclosure and are not intended to limit the present disclosure.

A portrait image processing method provided by the present disclosure can be applied to an electronic device 100 as shown in FIG. 1, and the electronic device 100 may be, but is not limited to, various smart phones, digital cameras, personal computers, laptop, tablet computers, and the like. The electronic device 100 may be loaded with a camera 101, the electronic device 100 captures a portrait image to be processed via the camera 101, and executes the portrait image skin retouching method according to the embodiments of the present disclosure on the portrait image, so as to perform retouching on the portrait image to be processed, and obtain a retouched result image. In an alternative embodiment, the electronic device 100 may also acquire the portrait image to be processed from other devices through a communication mean such as a network, or read the portrait image to be processed from a local memory, and then perform the portrait image retouching method according to the embodiment of the present disclosure on the acquired portrait image. The electronic device 100 may also be loaded with a display screen 102, so that the electronic device 100 can display the obtained the retouched result image on the display screen 102 for a user to view.

In an embodiment, the portrait image skin retouching method is provided, which may be applied to the electronic device 100 as shown in FIG. 1. As shown in FIG. 2, the method in the embodiment includes following steps S210-S250:

S210, a skin area and a portrait structure area contained in the skin area are identified from a portrait image to be processed.

Wherein, the portrait image to be processed may be an original image captured by the electronic device 100 in real time or an image obtained by certain processing to the original image, and the portrait image to be processed can also be an image read from other devices or the local memory of the electronic device 100. The portrait image to be processed contains information of portrait.

The skin area S skin refers to the area of the image where the skin of the human body is generally located. For example, the skin area may include a face area for beautification applications against human faces. However, it is generally understood that in practical applications, the skin area may also include other human skin areas such as ears, necks, and hands, that is, the portrait image processing method of the present disclosure may also identify and process other human skin areas such as ears, necks, arms, and hands during operation.

The identification of the skin area can be achieved by any known technique such as an Artificial Intelligence (AI) model, for example, the U-NET model provided in Ronneberger O, Fischer P, Brox T. U-Net: Convolutional Networks for Biomedical Image Segmentation[J]. Springer, Cham, 2015. can be utilized to identify the skin area, which is not described in detail here.

After the skin area is identified from the portrait image, the portrait structure area contained in the skin area may be extracted.

The portrait structure area $S_{struct}$ can be specifically defined to include different areas according to application needs, for example, in the application of face beauty, the portrait structure area can include eyes, eyebrows, nose, mouth, ears, and the area where the outline of the face is located. However, in other embodiments, the portrait structure area may also contain more or fewer areas or different areas. For example, in the application of hands beauty, the portrait structure area may include fingernails, areas where outline of the hands are located, and the like.

The identification of the portrait structure area can be achieved by any known technique such as an AI model, for example, the U-NET model provided in Ronneberger O, Fischer P, Brox T. U-Net: Convolutional Networks for Biomedical Image Segmentation[J]. Springer, Cham, 2015. can be utilized to identify the skin area, which is not described in detail here.

S220, a skin analysis area is determined, which is a remaining area of the skin area except the portrait structure area.

In this step, in order to avoid the portrait structural area interfere with the skin pixel value distribution statistics, the remaining area of the identified skin area except the portrait structural area is determined as the skin analysis area, that is, the skin analysis area is $$S = S_{skin} - S_{struct}.$$

S230, a pixel value distribution in the skin analysis area is fitted by utilizing a Gaussian mixture model, to determine one or more model parameters of the fitted Gaussian mixture model.

The Gaussian mixture model (GMM) is a probability-based clustering model that considers the probability of each point appearing as the result of a mixture of several Gaussian models. The Gaussian mixture model may consist of a linear addition of K Gaussian models.

The probability density function of a single Gaussian model is shown as follows:

$$P(x|\theta) = \frac{1}{\sqrt{2\pi\sigma^2}} \exp\left(-\frac{(x-\mu)^2}{2\sigma^2}\right)$$

in the above formula, x represents a random variable, $P(x|\theta)$ represents a probability of generating x, $\theta$ represents the model parameters of the single Gaussian model, $\mu$ represents an average value, $\sigma^2$ represents variance, then $\sigma$ represents standard deviation.

Accordingly, the Gaussian mixture model can be regarded as the linear addition of K Gaussian models, and the probability density function of the Gaussian mixture model is shown as the following formula:

$$p(x) = \sum_{k=1}^{K} \pi_k N\left(x|\mu_k, \sum_k\right)$$

in the above formula, x represents a random variable, p(x) represents a probability of generating x, $N(x|\mu_k, \Sigma_k)$ represents the probability density function of a kth Gaussian model, $\pi_k$ represents the weight of a kth Gaussian model, $\mu_k$ represents the average value of a kth Gaussian model, $\Sigma_k$ represents the variance of a kth Gaussian model. Wherein, $$\sum_{k=1}^{K} \pi_k = 1.$$

In this step, the Gaussian mixture model with a suitable number K of the Gaussian models may be constructed according to the pixel value distribution characteristics of the skin analysis area, so as to fit the pixel value distribution in the skin analysis area by the constructed Gaussian mixture model, thereby the model parameters of the fitted Gaussian mixture model are determined.

Wherein, the pixel value of each pixel in the image may include values of multiple channels and taking the pixel value represented by RGB channels as an example, each pixel value may include values of a red (R) channel, a green (G) channel, and a blue (B) channel, that is, an R value, a G value, and a B value.

In an embodiment, a gray value of the pixel value of each pixel of the skin analysis area may be taken, and the gray value distribution of each pixel is configured to represent the pixel value distribution. The constructed Gaussian mixture model is configured to fit the gray value distribution in the skin analysis area, so as to determine the model parameters of the fitted Gaussian mixture model. Taking the pixel value expressed by RGB channels as an example, the gray value corresponding to the pixel value of each pixel, that is, a Gr value, can be determined. By simplifying the values of the multiple channels included in each pixel value to a value of a single channel, the pixel value distribution in the skin analysis area can be fitted more easily.

In an embodiment, the Gaussian mixture model may be constructed to contain the linear addition of three Gaussian models, that is, a first Gaussian model, a second Gaussian model and a third Gaussian model, it being understood that K=3 at this time. Wherein, the first Gaussian model is configured to fit pixel value distribution of one or more skin bright areas in the skin analysis area, the second Gaussian model is configured to fit the pixel value distribution of one or more skin shadow areas in the skin analysis area, and the third Gaussian model is configured to fit the pixel value distribution of one or more spot areas in the skin analysis area.

Figure 3:
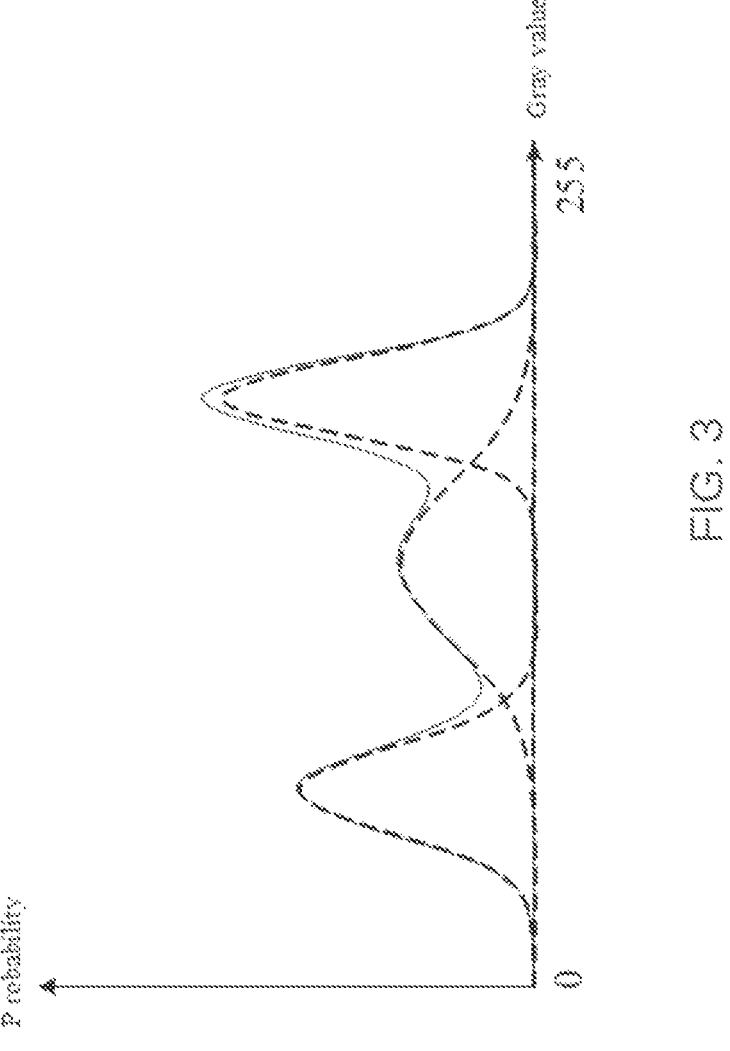
FIG. 3 is a schematic diagram of a probability density function of a Gaussian mixture model according to an embodiment of the present disclosure.

Referring to FIG. 3, a diagram of an exemplary Gaussian mixture model fitting the distribution of the pixel values in the skin analysis area is shown. In the embodiment, the pixel value of each pixel in the skin analysis area is first converted into gray values, and then the gray value distribution of pixels in the skin analysis area is fitted by the modeled Gaussian mixture model containing three Gaussian models. The dotted line with a peak value on the right side represents the probability density function of the first Gaussian model, the dotted line with the peak value in the middle represents the probability density function of the second Gaussian model, the dotted line with the peak value on the left side represents the probability density function of the third Gaussian model, and the solid line with the three peak values represents the Gaussian mixture model formed by linear addition of the first Gaussian model, the second Gaussian model and the third Gaussian model.

In this way, the Gaussian mixture model including the linear addition of the three Gaussian models is used to fit the pixel value distribution of the skin bright areas, the pixel value distribution of the skin shadow areas and the pixel value distribution of the spot areas in the skin analysis area, such that the pixel value distribution of the skin analysis area can be more reasonably and accurately fitted.

Wherein the model parameters may include the average value $\mu_k$, the variance $\Sigma_k$ and the weight $\pi_k$ of each of multiple Gaussian models included in the Gaussian mixture model. For example, in the case of the Gaussian mixture model includes the linear addition of the first Gaussian model, the second Gaussian model and the third Gaussian model, that is, K=3, the model parameters of the Gaussian mixture model fitted in this step accordingly include the average value $\mu_1$, the variance $\Sigma_1$ and the weight $\pi_1$ of the first Gaussian model, the average value $\mu_2$, the variance $\Sigma_2$ and the weight $\pi_2$ of the second Gaussian model, the average value $\mu_3$, the variance $\Sigma_3$ and the weight $\pi_3$ of the third Gaussian model.

In an embodiment, S230 includes: an expectation maximization algorithm is configured to fit the pixel value distribution in the skin analysis area by utilizing the Gaussian mixture model, to determine the model parameters of the fitted Gaussian mixture model.

The pixel values of each pixel in the skin analysis area may be taken as a sample data set to use an Expectation Maximization (EM) algorithm to perform maximum likelihood estimation on the model parameters of the Gaussian mixture model in the process of fitting the pixel value distribution in the skin analysis area via the Gaussian mixture model.

Training the Gaussian mixture model by using the EM algorithm can be summarized as a process of repeatedly performing step E and step M until the Gaussian mixture model converges under a set maximum iteration number J under a condition that the sample data set is known.

Said training process may include the following steps:
(1) Randomly initialize the model parameters of the Gaussian mixture model.
(2) E step: based on the sample data set, the posterior probability of a latent variable (namely the expectation of the hidden variable) is calculated according to the initial values of the model parameters or the values of the model parameters obtained in last iteration, which is configured as the likelihood value of the hidden variable in the current iteration.
(3) M step: substitute the likelihood value of the hidden variable in the current iteration into a likelihood function Q(z), and maximize the obtained likelihood function Q(z) to obtain the value of the model parameters of the current iteration.
(4) repeat the iteration of the (2) E step and the (3) M step mentioned above until the Gaussian mixture model converges to determine the optimal model parameters. When the deviations between the average value and the variance of the Gaussian mixture model of the current iteration and the average value and the variance obtained by last calculation are respectively less than threshold values $\epsilon1$ and $\epsilon2$, the Gaussian mixture model is considered to be converged, and the iteration is terminated; wherein the $\epsilon1$ and the $\epsilon2$ can be determined according to need, for example, can be set according to an empirical value.

S240, a retouching intensity parameter is determined based on variances in the model parameters.

In an embodiment, S240 includes: determining the average value of standard deviations corresponding to the variances of multiple Gaussian models included in the Gaussian mixture model; determining the retouching intensity parameter based on the average value; wherein, the retouching intensity parameter is proportional to the average value.

In the case that the model parameters of the Gaussian mixture model are determined by performing the above steps, that is, the K variances $\Sigma_1$, $\Sigma_2$, . . . , $\Sigma_3$ (of the K Gaussian models included in the Gaussian mixture model are determined. Due to the standard deviation $\sigma_k$ is an arithmetic square root of the variance $\Sigma_k$, the k standard deviations $\sigma_1$, $\sigma_2$, . . . , $\sigma_k$ of the K Gaussian models are thus correspondingly determined.

In this embodiment, an average value $$\overline{\sigma} = \frac{1}{K} \cdot \sum_{k=1}^{K} \sigma_k$$

of the K standard deviations $\sigma_1$, $\sigma_2$, . . . , $\sigma_k$ may be taken to measure the image quality of the current skin analysis area, and thus the retouching intensity parameter can be determined based on the average value $\overline{\sigma}$.

In an embodiment, the larger $\overline{\sigma}$ it indicates the richer details and clearer image of the skin analysis area, then the higher retouching intensity parameter is determined; on the contrary, the smaller $\overline{\sigma}$, it indicates the fewer details and the blurrier image of the skin analysis area, then the lower retouching intensity parameter is determined. Thus, the retouching intensity parameter can be flexibly adjusted on the base of the image quality of the skin analysis area.

S250, skin retouching is performed on the portrait image to be processed based on the retouching intensity parameter.

In an embodiment, S250 includes: performing bilateral filtering on the portrait image to be processed; wherein, the retouching intensity parameter includes a Gaussian function standard deviation of the definition domain kernel contained in the weight coefficient of the bilateral filtering and the Gaussian function standard deviation of the value domain kernel contained in the weight coefficient.

Further, In an embodiment, said obtain the retouched result image by performing bilateral filtering on the portrait image to be processed includes: under the condition that a non-skin area and the portrait structure area in the portrait image to be processed are protected, skin retouching is performed on the skin analysis area in portrait image to be processed via bilateral filtering.

After the skin retouching is performed, the retouched result image can be obtained.

Wherein, the non-skin area refers to an area that generally does not include skin in the portrait image to be processed. The non-skin area may include, for example, background, clothing, hair, etc. In this embodiment, after the skin area is identified, the remaining area of the portrait image except the skin area may be determined as the non-skin area. In other embodiments, image identification may be performed on the portrait image to directly identify the non-skin area.

Wherein, said the non-skin area and the portrait structure area in the portrait image to be processed are protected can be realized via a generated mask of the non-skin area and the portrait structure area. The mask can prohibit retouching the area where the mask is located in the portrait image when the skin retouching is executed on the portrait image. The skin retouching is not performed on the non-skin area and the portrait structure area during retouching, so that the details of the image outside the skin analysis area can be preserved as much as possible.

Bilateral Filtering is a nonlinear filtering, which can combine spatial proximity and pixel value similarity of an image, and can protect the edge characteristics of the image while denoising.

Wherein, the bilateral filtering process may be as following:

$$g(i, j) = \frac{\sum_{kl} f(k, l) w(i, j, k, l)}{\sum_{kl} w(i, j, k, l)}$$

wherein the above formula, (i, j) represents the coordinate of an arbitrary point within the filter window, g(i, j) represents the pixel value of the image at the coordinate (i, j) after bilateral filtering, (k, l) represents the coordinate of the center point of the filter window, f(k, l) represents the pixel value of the image at the coordinate (k, l) before the bilateral filtering, and w(i, j, k, l) represents the weight coefficient of the bilateral filtering.

Wherein, the size of the filter window can be set according to actual needs.

Wherein, the weight coefficient of the bilateral filtering depends on the product of the definition domain kernel, d(i, j, k, l) and the value domain kernel, r(i, j, k, l) as shown in the following formula:

$$d(i, j, k, l) = \exp\left(-\frac{(i-k)^2 + (j-1)^2}{2\sigma_d^2}\right)$$

$$r(i, j, k, l) = \exp\left(-\frac{\|f(i, j) - f(k, l)\|^2}{2\sigma_r^2}\right)$$

$$w(i, j, k, l) = \exp\left(-\frac{(i-k)^2 + (j-1)^2}{2\sigma_d^2} - \frac{\|f(i, j) - f(k, l)\|^2}{2\sigma_r^2}\right)$$

Wherein the above formula, $\sigma_d$ is the Gaussian function standard deviation of the definition domain kernel, and $\sigma_r$ is the Gaussian function standard deviation of the value domain kernel.

In the present embodiment, the retouching intensity parameter may include the Gaussian function standard deviation $\sigma_d$ of the definition domain kernel and the Gaussian function standard deviation $\sigma_r$ of the value domain kernel, that is, in step S240 the Gaussian function standard deviation $\sigma_d$ of the definition domain kernel and the Gaussian function standard deviation $\sigma_r$ of the value domain kernel can be determined based on the average value $\overline{\sigma}$ accordingly.

Further, in an embodiment, the larger the $\overline{\sigma}$ is, the higher Gaussian function standard deviation $\sigma_d$ of the definition domain kernel and the higher Gaussian function standard deviation $\sigma_r$ of the value domain kernel can be determined. On the contrary, the smaller the $\overline{\sigma}$ is, the lower Gaussian function standard deviation $\sigma_d$ of the definition domain kernel and the lower Gaussian function standard deviation $\sigma_r$ of the value domain kernel can be determined. Thus, the weight coefficient of the bilateral filtering can be flexibly adjusted based on the image quality of the skin analysis area.

Illustratively, the Gaussian function standard deviation $\sigma_d$ of the definition domain kernel and the Gaussian function standard deviation $\sigma_r$ of the value domain kernel are determined based on the average value $\overline{\sigma}$ as shown in the following formula:

$$\sigma_d = 5 + \frac{\overline{\sigma}}{60}$$

$$\sigma_r = 1.2 * \overline{\sigma}$$

that is, the larger the average value $\overline{\sigma}$ and the richer the image details, the larger $\sigma_d$ and $\sigma_r$, i.e. the larger retouching intensity parameter, the stronger the retouching intensity.

According to the portrait image skin retouching method provided above, the Gaussian mixture model is utilized to fit the pixel value distribution in the skin analysis area in the portrait image to be processed, so as to determine the model parameters of the fitted Gaussian mixture model. And the retouching intensity parameters are determined based on the variances in the model parameters, and the portrait image to be processed is retouched according to the retouching intensity parameters. Since the variances in the fitted model parameters can represent an image quality of the skin in the skin analysis area, the skin retouching intensity parameters are varied adaptively with the image qualities of the skin to perform different intensities of skin retouching on the portrait image to be processed. Thus, different skin retouching intensity parameters are adjusted adaptively for portrait images with different image qualities, so as to achieve the appropriate skin retouching effect.

It should be understood that, although the steps in the flowchart of FIG. 2 are shown in the order as indicated by the arrows, the steps are not necessarily performed in the order as indicated by the arrows. The steps are not limited to being performed in the exact order and, unless explicitly stated herein, may be performed in other orders. Moreover, at least a portion of the steps in FIG. 2 may include multiple sub-steps or multiple stages that are not necessarily performed at the same time, but may be performed at different times, and the order of performance of the sub-steps or stages is not necessarily sequential, but may be performed in turn or alternately with other steps or at least a portion of the sub-steps or stages of other steps.

Figure 4:
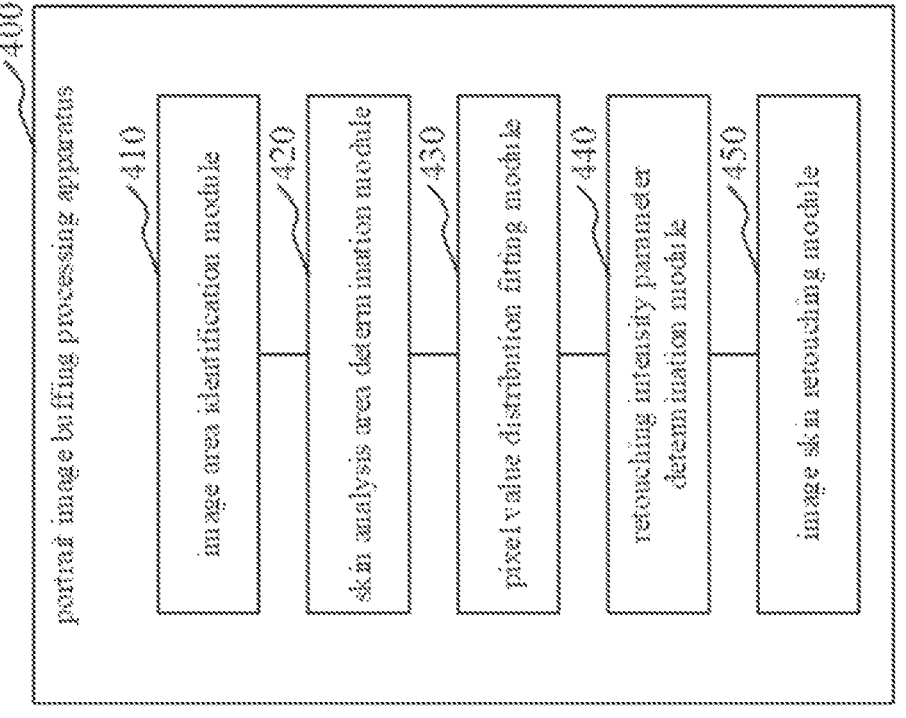
FIG. 4 is a block diagram of a portrait image skin retouching apparatus according to an embodiment of the present disclosure.

In an embodiment, as shown in FIG. 4, a portrait image skin retouching apparatus 400 is provided, which includes: an image area identification module 410, a skin analysis area determination module 420, a pixel value distribution fitting module 430, a retouching intensity parameter determination module 440, and an image skin retouching module 450, wherein:

the image area identification module 410 is configured to identify the skin area and the portrait structure area contained in the skin area from the portrait image to be processed;

the skin analysis area determination module 420 is configured to determine the skin analysis area, which is the remaining area of the skin area except the portrait structure area;

the pixel value distribution fitting module 430 is configured to fit the pixel value distribution in the skin analysis area by utilizing the Gaussian mixture model, to determine one or more model parameters of the fitted Gaussian mixture model;

the retouching intensity parameter determination module 440 is configured to determine the retouching intensity parameter based on the variances in the model parameters;

and the image skin retouching module 450 is configured to perform the retouching process on the portrait image to be processed based on the retouching intensity parameter.

For specific limitations of the portrait image skin retouching apparatus 400, reference may be made to the above limitations of the portrait image skin retouching method, which will not be provided herein again. The modules in the portrait image skin retouching apparatus 400 are performed by a processor. The modules can be embedded in a hardware form can be stored in a memory in the electronic device in a software form, so that the processor can call and execute operations corresponding to the modules.

Figure 5:
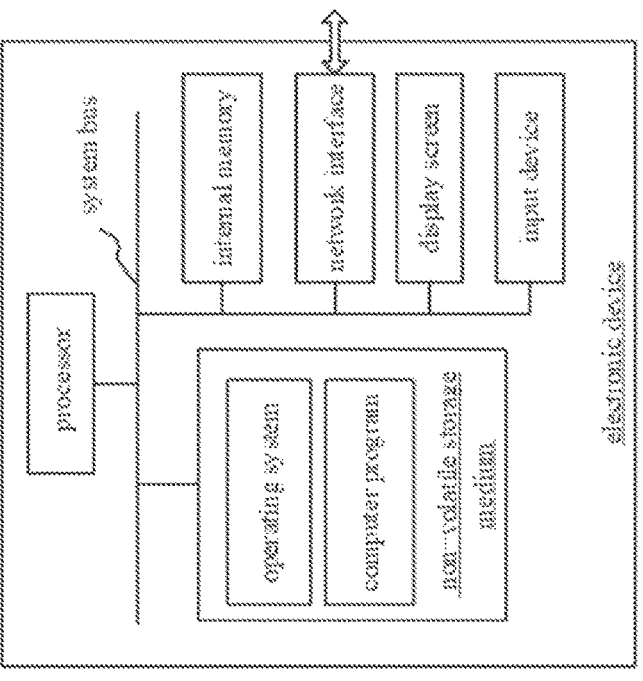
FIG. 5 is a schematic diagram of the internal structure of an electronic device according to an embodiment of the present disclosure.

In an embodiment, an electronic device is provided, whose internal structure diagram is shown as FIG. 5. The electronic device includes a processor, a memory, a network interface, a display screen and an input device which are connected through a system bus. Wherein the processor of the electronic device is configured to provide computing and control capabilities. The memory of the electronic device includes a non-volatile storage medium and an internal memory. The non-volatile storage medium stores an operating system and a computer program. The internal memory provides an environment for the operation of an operating system and computer programs in the non-volatile storage medium. The network interface of the electronic device is configured for connecting and communicating with an external terminal through a network. The computer program is executed by a processor to carry out the portrait image skin retouching method. The display screen of the electronic device can be a liquid crystal screen or an electronic ink screen, and the input device of the electronic device can be a touch layer covered on the screen, a key, a track ball or a touch pad set on the shell of the electronic device, an external keyboard, a touch pad or a mouse and the like.

Those skilled in the art will understand that the configuration shown in FIG. 5 is a block diagram of only a portion of the configuration associated with the present disclosure, and does not constitute a limitation on the electronic device to which the present disclosure is applied, and a particular electronic device may include more or fewer components than those shown in the drawings, or may combine certain components, or have a different arrangement of components.

Figure 6:
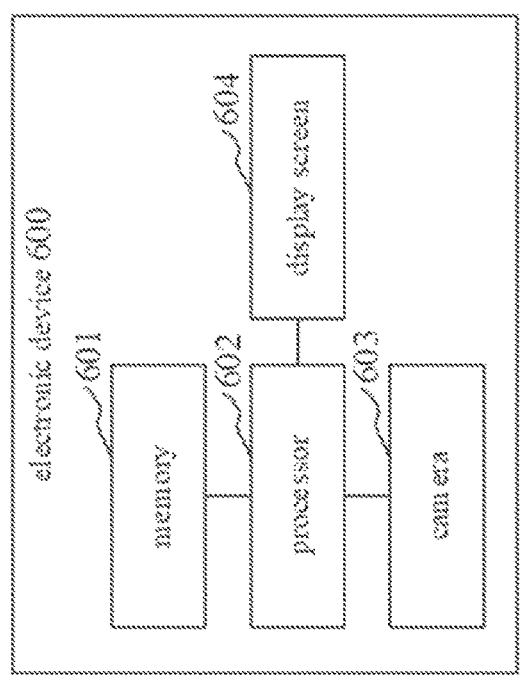
FIG. 6 is a schematic diagram of an electronic device according to an embodiment of the present disclosure.

In an embodiment, as shown in FIG. 6, an electronic device 600 is provided, including a memory 601 and a processor 602, wherein the memory 601 is connected to the processor 602 and the memory 601 stores computer programs which, when executed by the processor 602, cause the following steps to be performed:

identifying the skin area and the portrait structure area contained in the skin area from a portrait image to be processed;

determining the skin analysis area, which is the remaining area of the skin area except the portrait structure area;

fitting the pixel value distribution in the skin analysis area by utilizing the Gaussian mixture model, to determine one or more model parameters of the fitted Gaussian mixture model;

determining the retouching intensity parameter based on the variances in the model parameters; and performing skin retouching on the portrait image to be processed based on the retouching intensity parameter.

In an embodiment, as shown in FIG. 6, the electronic device 600 may further include a camera 603 coupling to the electronic device 600. Said "coupling" is intended to include both a form in which the camera 603 is directly provided in the electronic device 600 and a form in which the camera 603 is provided outside the electronic device 600 (for example, the camera 603 is provided on other terminal devices) and is communicatively connected to the electronic device 600. The camera 603 is communicatively connected to the processor 602; the camera 603 is configured for capturing a portrait image and transmitting the portrait image to the processor 602; the processor 602 receives the portrait image from the camera 603.

In an embodiment, as shown in FIG. 6, the electronic device 600 may further include a display screen 604, the display screen 604 is connected to the processor 602; the processor 602, when executing the computer program, also controls the display screen 604 to display the retouched result image obtained after the skin retouching.

In other embodiments, the processor 602, when executing the computer program, further performs the steps of the portrait image skin retouching method according to the above embodiments of the present disclosure and has corresponding advantages.

In an embodiment, a non-transitory computer readable storage medium having computer programs stored thereon is provided, wherein when the computer programs executed by a processor, performs the following steps:

identifying the skin area and the portrait structure area contained in the skin area from a portrait image to be processed;

determining the skin analysis area, which is the remaining area of the skin area except the portrait structure area;

fitting the pixel value distribution in the skin analysis area by utilizing the Gaussian mixture model, to determine one or more model parameters of the fitted Gaussian mixture model;

determining the retouching intensity parameter based on the variances in the model parameters; and performing skin retouching on the portrait image to be processed based on the retouching intensity parameter.

In other embodiments, the processor, when executing the computer program, further performs the steps of the portrait image skin retouching method according to the above embodiments of the present disclosure, and has corresponding advantages.

It will be understood by those skilled in the art that all or part of the processes of the methods of the embodiments provided above can be implemented by hardware instructions of a computer program, which can be stored in a non-volatile computer-readable storage medium, and when executed, can include the processes of the embodiments of the methods provided above. Wherein, any reference to memory, storage, database, or other medium configured in the embodiments provided herein may include non-volatile and/or volatile memory. Non-volatile memory can include read-only memory (ROM), programmable ROM (PROM), electrically programmable ROM (EPROM), electrically erasable programmable ROM (EEPROM), or flash memory. Volatile memory can include random access memory (RAM) or external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), synchronous Link DRAM (SLDRAM), rambus direct RAM (RDRAM), direct rambus dynamic RAM (DRDRAM), and rambus dynamic RAM (RDRAM).

The technical features of the above embodiments can be arbitrarily combined, and for the sake of brevity, not all possible combinations of the technical features in the above embodiments are provided. However, as long as there is no contradiction in the combinations of these technical features, they should be considered within the scope of this disclosure.

The above-provided embodiments only express several embodiments of the present disclosure, and the description thereof is more specific and detailed, but not construed as limiting the scope of the invention. It should be noted that, for those skilled in the art, several variations and modifications can be made without departing from the concept of the present disclosure, which falls within the scope of protection of the present disclosure. Therefore, the protection scope of the present patent shall be subject to the appended claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A portrait image skin retouching method, the method comprising:

identifying a skin area and a portrait structure area contained in the skin area from a portrait image to be processed;

determining a skin analysis area, which is a remaining area of the skin area except the portrait structure area;

fitting a pixel value distribution in the skin analysis area by utilizing a Gaussian mixture model, to determine one or more model parameters of the fitted Gaussian mixture model;

determining the average value of standard deviations corresponding to the variances of multiple Gaussian models included in the Gaussian mixture model;

determining the retouching intensity parameter based on the average value, wherein the retouching intensity parameter is proportional to the average value; and performing skin retouching on the portrait image to be processed based on the retouching intensity parameter.

2. The method according to claim 1, wherein the Gaussian mixture model comprises a linear addition of a first Gaussian model, a second Gaussian model, and a third Gaussian model.

3. The method according to claim 2, wherein the first Gaussian model is configured to fit the pixel value distribution of one or more skin bright areas in the skin analysis area, the second Gaussian model is configured to fit the pixel value distribution of one or more skin shadow areas in the skin analysis area, and the third Gaussian model is configured to fit the pixel value distribution of one or more spot areas in the skin analysis area.

4. The method according to claim 1, wherein said fitting the pixel value distribution in the skin analysis area by utilizing the Gaussian mixture model, to determine one or more model parameters of the fitted Gaussian mixture model comprises:

using an expectation maximization algorithm to fit the pixel value distribution in the skin analysis area by utilizing the Gaussian mixture model, to determine the model parameters of the fitted Gaussian mixture model.

5. The method according to claim 1, wherein the model parameters comprise average values, variances, and weights of multiple Gaussian models included in the Gaussian mixture model.

6. The method according to claim 1, wherein said determining the retouching intensity parameter based on variances in the model parameters comprises:

determining an average value of standard deviations corresponding to the variances of multiple Gaussian models included in the Gaussian mixture model; and determining the retouching intensity parameter based on the average value; wherein, the retouching intensity parameter is proportional to the average value.

7. The method according to claim 1, wherein said performing skin retouching on the portrait image to be processed based on the retouching intensity parameter comprises:

performing a bilateral filtering on the portrait image to be processed;

wherein, the retouching intensity parameter includes a Gaussian function standard deviation of a definition domain kernel contained in a weight coefficient of the bilateral filtering and a Gaussian function standard deviation of a value domain kernel contained in the weight coefficient.

8. An electronic device, comprising a memory configured to store computer programs; and a processor configured to execute the computer programs to cause the steps of the portrait image skin retouching method to be performed, the method comprising:

identifying a skin area and a portrait structure area contained in the skin area from a portrait image to be processed;

determining a skin analysis area, which is a remaining area of the skin area that does not include the portrait structure area;

fitting a pixel value distribution in the skin analysis area by utilizing a Gaussian mixture model, to determine one or more model parameters of the fitted Gaussian mixture model;

determining the average value of standard deviations corresponding to the variances of multiple Gaussian models included in the Gaussian mixture model;

determining the retouching intensity parameter based on the average value, wherein the retouching intensity parameter is proportional to the average value; and performing skin retouching on the portrait image to be processed based on the retouching intensity parameter.

9. A non-transitory computer-readable storage medium, having computer programs stored thereon, wherein when the computer programs are executed by a processor, performs the steps of the portrait image skin retouching method to be performed, the method comprising:

identifying a skin area and a portrait structure area contained in the skin area from a portrait image to be processed;

determining a skin analysis area, which is a remaining area of the skin area that does not include the portrait structure area;

fitting a pixel value distribution in the skin analysis area by utilizing a Gaussian mixture model, to determine one or more model parameters of the fitted Gaussian mixture model;

determining the average value of standard deviations corresponding to the variances of multiple Gaussian models included in the Gaussian mixture model;

determining the retouching intensity parameter based on the average value, wherein the retouching intensity parameter is proportional to the average value; and performing skin retouching on the portrait image to be processed based on the retouching intensity parameter.

\* \* \* \* \*